(12) United States Patent
Lee

(10) Patent No.: US 12,272,240 B2
(45) Date of Patent: Apr. 8, 2025

(54) HUMAN MACHINE INTERFACE DEVICE OF A VEHICLE AND A CONTROLLING METHOD THEREOF

(71) Applicants: HYUNDAI MOTOR COMPANY, Seoul (KR); KIA CORPORATION, Seoul (KR)

(72) Inventor: Hong Gyu Lee, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 246 days.

(21) Appl. No.: 17/878,699

(22) Filed: Aug. 1, 2022

(65) Prior Publication Data

US 2023/0267836 A1    Aug. 24, 2023

(30) Foreign Application Priority Data

Feb. 22, 2022 (KR) .................. 10-2022-0023190

(51) Int. Cl.
G08G 1/0968 (2006.01)
G01C 21/34 (2006.01)
G06Q 50/40 (2024.01)

(52) U.S. Cl.
CPC .......... G08G 1/096844 (2013.01); G01C 21/3492 (2013.01); G06Q 50/40 (2024.01)

(58) Field of Classification Search
None
See application file for complete search history.

(56) References Cited

U.S. PATENT DOCUMENTS 9,940,840 B1 * 4/2018 Schubert ................ G06Q 30/06

* cited by examiner

Primary Examiner — Yufeng Zhang
(74) Attorney, Agent, or Firm — Lempia Summerfield Katz LLC

(57) ABSTRACT

A Human Machine Interface (HMI) device for a vehicle includes a determination unit configured to determine whether to recommend an alternative type of transportation around a vehicle, a calculation unit configured to calculate at least one of an expected arrival time or an expected fare of the passenger to arrive at a destination on the navigation route using the alternative type of transportation, and an interface unit configured to provide the passenger with at least one of the expected arrival time or the expected fare for the passenger. The determination unit may determine whether to recommend an alternative type of transportation around the vehicle based on at least one of a traffic congestion degree in a navigation route of the vehicle, a discontent degree of the passenger, input from the passenger, or an update of an expected arrival time of the vehicle.

13 Claims, 9 Drawing Sheets

HUMAN MACHINE INTERFACE DEVICE OF A VEHICLE AND A CONTROLLING METHOD THEREOF

CROSS-REFERENCE TO RELATED APPLICATION

This application claims priority to and the benefit of Korean Patent Application No. 10-2022-0023190, filed on Feb. 22, 2022, the disclosure of which is incorporated herein by reference in its entirety.

TECHNICAL FIELD

The present disclosure relates to a Human Machine Interface (HMI) device of a vehicle and a controlling method thereof, particularly, an HMI device of an autonomous vehicle and a method of controlling the HMI device.

BACKGROUND

The following description simply provides only the background information related to the embodiments of the present disclosure without configuring the related art.

Currently, research on autonomous vehicles is being actively conducted. Development of a driving assist technology for ensuring the safety of a driver and providing comfort or convenience in driving and an autonomous driving technology that enables a vehicle to drive on a road without intervention of a passenger is being accelerated. Such an autonomous vehicle is used as a robotaxi.

An autonomous vehicle can provide a passenger with the current driving information and the next driving actions using a Human Machine Interface (HMI) for convenience of the passenger. For example, an autonomous vehicle can create the route information between a departure place to a destination based on a Global Positioning System (GPS) signal and map information and can provide the route information to a passenger.

However, in the related art, autonomous vehicles only provide route information of the vehicles rather than providing information connected with other transportation means. Further, there is a problem that autonomous vehicles in the related art cannot provide appropriate connected information to a passenger in consideration of various situations.

SUMMARY

According to at least one aspect, the present disclosure provides a Human Machine Interface (HMI) device for a vehicle. The HMI device includes; a determination unit configured to determine whether to recommend a transportation means around (i.e., near or proximate to) a vehicle based on at least one of a traffic congestion degree in a navigation route of the vehicle, a discontent degree of a passenger, input from the passenger, or an update of an expected arrival time of the vehicle; a calculation unit configured to calculate at least one of an expected arrival time or an expected fare of the passenger to arrive at a destination on the navigation route using the transportation means; and an interface unit configured to provide the passenger with at least one of the expected arrival time or the expected fare for the passenger.

According to at least another aspect, the present disclosure provides a method of controlling a Human Machine Interface (HMI) device for a vehicle. The method includes: determining whether to recommend a transportation means around a vehicle based on at least one of a traffic congestion degree in a navigation route of the vehicle, a discontent degree of a passenger, input from the passenger, or an update of an expected arrival time of the vehicle; calculating at least one of an expected arrival time or an expected fare of the passenger to arrive at a destination on the navigation route using the transportation means; and providing the passenger with at least one of the expected arrival time or the expected fare for the passenger.

DETAILED DESCRIPTION

Figure 1:
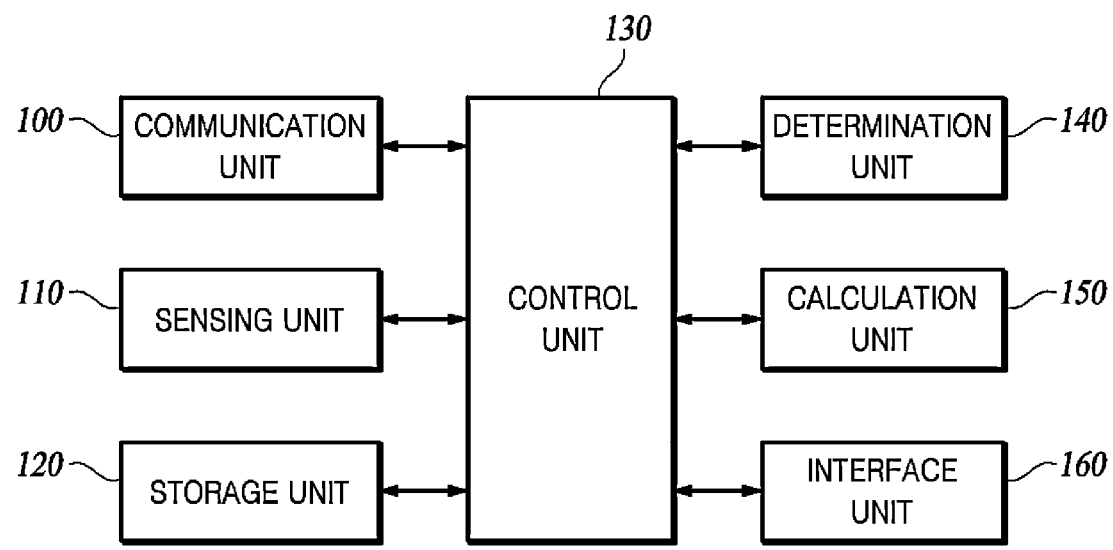
FIG. 1 is a configuration diagram of a Human Machine Interface (HMI) device according to an embodiment of the present disclosure.

An objective of embodiments of the present disclosure is to provide a Human Machine Interface (HMI) device for reducing a travel time for a passenger by recommending other transportation means that can arrive at a destination earlier than a vehicle during autonomous driving of the vehicle, and a method of controlling the HMI device.

Another objective of embodiments of the present disclosure is to provide an HMI device for providing a passenger with an improved convenience service by considering a traffic congestion degree, a discontent degree of a passenger, input from the passenger, or an update of an expected arrival time to recommend other transportation means, and a method of controlling the HMI device.

Hereinafter, some embodiments of the present disclosure are described in detail with reference to the drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure, which may obscure the subject matter of the present disclosure, has been omitted.

In addition, terms, such as "first", "second", "i)", "ii)", "a)", "b)", or the like, may be used in describing the components of the present disclosure. These terms are intended only for distinguishing a corresponding component from other components, and the nature, order, or sequence of the corresponding component is not limited by the terms. In the specification, when a unit 'includes', 'comprises', or 'is provided with' a certain component, it means that other components may be further included, without excluding other components, unless otherwise explicitly stated.

Each component of the device or method according to the present disclosure may be implemented as hardware or software, or a combination of hardware and software. In addition, the function of each component may be implemented as software and a microprocessor may execute the function of software corresponding to each component. When a component, device, element, or the like of the present disclosure is described as having a purpose or performing an operation, function, or the like, the component, device, or element should be considered herein as being "configured to" meet that purpose or perform that operation or function.

In the specification, a vehicle and a transportation means may be various types of transportation means such as a subway, a bus, an autonomous vehicle, a robotaxi, a Purpose Built Vehicle (PBV), an Urban Air Mobility (UAM) device, a scooter, a bicycle, a bike, a drone, a personal mobility device, a personal air vehicle, a mobile robot, a two-wheel drive device, and the like.

FIG. 1 is a configuration diagram of an HMI device according to an embodiment of the present disclosure.

Referring to FIG. 1, an HMI device 10 includes at least one of a communication unit 100, a sensing unit 110, a storage unit 120, a control unit 130, a determination unit 140, a calculation unit 150, or an interface unit 160.

The components of the HMI device 10 can exchange signals or data through an automotive internal communication system. The automotive internal communication system can use at least one communication protocol (e.g., Controller Area Network (CAN), Local Interconnect Network (LIN), FlexRay, Media Oriented Systems Transport (MOST), or Ethernet).

The HMI device 10 may be mounted on a vehicle.

The communication unit 100 communicates with external devices or other vehicles.

The communication unit 100 can receive traffic information of navigation routes of the vehicle, traffic information around the vehicle, or information about at least one transportation means around the vehicle from an external device. The external device may be a road side unit or an external server. The navigation routes are routes between the current location of the vehicle and a destination. The traffic information includes a traffic congestion degree, signal information, sign information, traffic camera information, speed limit information, a road type, or the like. The information about the at least one transportation means includes the location of the at least one transportation means, identification information, waypoints, a destination, a type of transportation means, a travel time, or the like.

The communication unit 100 can receive driving information from other vehicles. The driving information includes the location, the speed, the acceleration, the direction, the prediction path, the path history, the type, or the like of another vehicle.

The communication unit 100 can use wireless communication such as Wi-Fi communication, Bluetooth communication, a WLAN, Ultra-mobile broadband (UMB) communication, Long Term Evolution (LTE) communication, Vehicle-to-Everything (V2X) communication, and the like.

The sensing unit 110 senses at least one of a voice of a passenger or a picture of a passenger in the vehicle.

The sensing unit 110 can sense a voice of a passenger using at least one microphone in the vehicle. When music is being played in the vehicle, the sensing unit 110 can extract a voice of a passenger from the sounds received by a microphone.

The sensing unit 110 can take a picture of a passenger using at least one camera in the vehicle. The sensing unit 110 can detect a passenger in an image or a video of the passenger.

The sensing unit 110 can receive a satellite signal using a Global Positioning System (GPS) and can estimate the location of the vehicle using the satellite signal.

The sensing unit 110 can sense driving information of other vehicles around the vehicle. The sensing unit 110 can sense driving information of other vehicles using a camera, a radar, Light Detection and Ranging (LiDAR), an infrared sensor, an ultrasonic sensor, or the like.

The storage unit 120 stores programs and information for controlling the HMI device. The storage unit 120 can store information that is received by the communication unit 100, information that is sensed by the sensing unit 110, information created by the determination unit 140 and the calculation unit 150, information input by the interface unit 160, or the like.

Further, the storage unit 120 can store map information including route information, building information, road information, or the like. The storage unit 120 can store a map as separate partial maps. Some of the partial maps can be used in accordance with the location of the vehicle.

The control unit 130 controls the HMI device 10 in cooperation with the communication unit 100, the sensing unit 110, the storage unit 120, the determination unit 140, the calculation unit 150, the interface unit 160, or a driving unit.

The control unit 130 can exchange information with an external device or other vehicles through the communication unit 100. The control unit 130 can collect a voice of a passenger or images taken by a camera through the sensing unit 110. The control unit 130 can perform determination required for controlling the HMI device 10 through the determination unit 130. The control unit 130 can perform calculation required for controlling the HMI device 10 through the calculation unit 150. The control unit 130 can receive input from a passenger or provide information to a passenger through the interface unit 160. The control unit 130 can control the vehicle through the driving unit.

The control unit 130 can electrically control various vehicle driving systems in the vehicle. A vehicle driving device 170 may include a steering system, a braking system, a suspension system, and/or a powertrain.

When the transportation means is a shared transportation means, the control unit 130 can reserve the shared transportation means by communicating with a server that manages the shared transportation means. The shared transportation means is a means that any user can use in real time by leasing or reserving after paying the fare.

The control unit 130 may be implemented as one or more Electronic Control Units (ECU), Micro Controller Units (MCU), or other sub-control units mounted on a vehicle.

The interface unit 160 provides information to a passenger or receives input from a passenger.

The interface unit 160 includes at least one of a communication interface or a Graphic User Interface (GUI).

The communication interface is an interface for interacting with a passenger through a passenger terminal.

The terminal may be a mobile device such as a smart phone, a smart watch, a laptop computer, or a tablet computer.

The communication interface can transmit a voice or an image, which a passenger terminal outputs to a passenger, to the passenger terminal. The communication interface can receive a voice, a video, touch input, or the like that a passenger terminal receives from a passenger terminal.

For example, the communication interface can provide information about other transportation means to a passenger terminal and can receive selection of a passenger input to the passenger terminal from the passenger terminal.

The communication interface can also interact with a passenger through a passenger terminal and a server to which the passenger terminal is connected. For example, a passenger can interact with the HMI device 10 by executing an application in a passenger terminal.

The communication interface and the communication unit 100 may be implemented as separate devices or may be implemented as a single device.

The GUI is an interface for visually interacting with a passenger.

The GUI includes at least one of an input unit or an output unit.

The input unit may be implemented as at least one physical button, a touch panel, a microphone, or the like. The input unit and the output unit may be combined into a touch display and the like. Further, the input unit may be implemented in other ways as long as it can receive predetermined information from a passenger.

The output unit may be implemented as a display that can provide visual output, a speaker that can provide aural output, a vibration module that can provide tactual output, or the like. Further, the output unit may be implemented in other ways as long as it can provide output to a passenger.

The GUI may be implemented as a display, an Audio Video Navigation (AVN), a Head Up Display (HUD), a cluster, or the like that is disposed in a predetermined area in a vehicle such as a seat, the back of a seat, the back of the headrest of a seat, or the like. The GUI may further include a hardware device for receiving an input of a passenger such as various buttons or switches, a pedal, a keyboard, a mouse, a track-ball, a lever, a handle, a stick, or the like.

The determination unit 140 determines whether to recommend another transportation means to a passenger in the vehicle.

In detail, the determination unit 140 can determine whether to recommend a transportation means around the vehicle based on at least one of a traffic congestion degree in a navigation route of the vehicle, the discontent degree of a passenger, input from the passenger, or an update of an expected arrival time of the vehicle.

First, the determination unit 140 can determine a traffic congestion degree in a navigation route of the vehicle.

For example, the determination unit 140 can determine a traffic congestion degree based on information received by the communication unit 100. For example, the determination unit 140 can determine a traffic congestion degree based on traffic information on a navigation route or traffic information around the vehicle which is received by the communication unit 100. As another example, the communication unit 100 may receive a traffic congestion degree determined by an external device and the determination unit 140 and may determine the received traffic congestion degree as the traffic congestion degree in the navigation route of the vehicle.

As another example, the determination unit 140 may determine a traffic congestion degree based on driving information of surrounding vehicles received by the communication unit 100. In detail, the determination unit 140 can determine a traffic congestion degree by comparing the speed limit of a navigation route with the average speed of other vehicles on the navigation route. When the average speed of other vehicles is lower than the speed limit of a navigation route, the determination unit 140 can determine that the traffic congestion degree is high. When the average speed of other vehicles is higher than the speed limit of a navigation route, the determination unit 140 can determine that the traffic congestion degree is low.

The determination unit 140 can determine a passenger discontent degree based on at least one of a voice of a passenger or an image of the passenger taken by a camera.

As an example, the determination unit 140 can determine a first discontent index based on the frequency of specific words included in the voice of a passenger. For example, the higher the frequency of specific words including congestion, an accident, a jam, delay, lateness, or the like in the voice of a passenger, the higher the first discontent index determined by the determination unit 140 may be. In this case, the frequency is determined by the number of times of specific words that are sensed for a specific time. The specific words may be set in advance.

As another example, the determination unit 140 can determine a second discontent index based on at least one of the facial expression, the gaze, or the behavior of a passenger in an image taken by a camera. In this case, the image means a picture or a video.

The determination unit 140 can classify facial expressions of a passenger into one of a positive facial expression, a negative facial expression, or a neutral expression, and can determine the second discontent index depending on the classified facial expressions. When the facial expression of a passenger is classified as a positive facial expression, the determination unit 140 can determine the second discontent index low. When the facial expression of a passenger is classified as a negative facial expression, the determination unit 140 can determine the second discontent index high. When the facial expression of a passenger is classified as a neutral facial expression, the determination unit 140 can determine the second discontent index as a medium value.

When a passenger frequently looks at the outside of the vehicle, the determination unit 140 can determine the second discontent index high. When a passenger looks at any one of the inside or the outside of the vehicle for a short time, the determination unit 140 can determine the second discontent index high.

When a passenger shows anxious behavior such as looking around, the determination unit 140 can determine the second discontent index as a high value. On the other hand, when a passenger reads a book or watches a movie, the determination unit 140 can determine the second discontent index as a low value.

The determination unit 140 can determine a passenger discontent degree according to at least one of a voice of the passenger or an image taken by a camera using Artificial Intelligence (AI). In detail, the determination unit can determine a passenger discontent degree according to at least one of a voice of the passenger or an image taken by a camera using supervised learning, unsupervised learning, or reinforcement learning. The determination unit 140 can accurately detect a voice, a facial expression, a gaze, or behavior of a passenger and can appropriately determine a passenger discontent degree using deep learning.

The determination unit 140 can determine a passenger discontent degree based on at least one of a first discontent index or a second discontent index. For example, when the first discontent index is larger than a preset value, the determination unit 140 may determine that a passenger discontent degree is high. As another example, when the second discontent index is larger than the preset value, the determination unit 140 may determine that a passenger discontent degree is high. As another example, when the sum of the first discontent index and the second discontent index is larger than the preset value, the determination unit 140 may determine that a passenger discontent degree is high. As another example, the determination unit 140 may determine the discontent degree of a passenger by applying a weight to each of the first discontent index and the second discontent index.

As an example, the determination unit 140 may determine a traffic congestion degree first and then determine a passenger discontent degree in accordance with the traffic congestion degree. The determination unit 140 may determine a passenger discontent degree after determining that a traffic congestion degree is larger than a critical value.

The determination unit 140 can determine the state of a passenger as a discontent state or a content state, depending on a passenger discontent degree.

The determination unit 140 can determine whether to recommend a transportation means around the vehicle in accordance with input from a passenger.

For example, the determination unit 140 can receive request for recommendation for a transportation means from a passenger through the interface unit 160 as input from the passenger and can determine whether to recommend a transportation means in accordance with the request. In this case, the interface unit 160 receives a transportation means recommendation request from a passenger as input from the passenger. For example, a passenger can press a transportation means recommendation request object using a touch screen panel in the vehicle. The touch screen panel transmits the transportation means recommendation request to the determination unit 140. The determination unit 140 may determine to recommend a transportation means around the vehicle when receiving a transportation means recommendation request. As another example, a passenger can press a transportation means recommendation request object using a passenger terminal and the determination unit 140 receives the transportation means recommendation request through the interface unit 160 and the passenger terminal and can determine to recommend a transportation means around the vehicle.

The determination unit 140 can determine whether to recommend a transportation means in consideration of the transportation means recommendation request over a traffic congestion degree, a passenger discontent degree, and an update of an expected arrival time of the vehicle.

As another example, the determination unit 140 can receive touch inputs from a passenger through the interface unit 160 as input from the passenger and can determine whether to recommend a transportation means around the vehicle based on the pattern of the touch inputs. In this case, the interface unit 160 receives touch inputs from a passenger as input from the passenger. For example, when map information and a map zoom-in object are shown on a display positioned on the back of a seat in the vehicle, a passenger may frequently press a map zoom-in icon on the display. The determination unit 140 may determine to recommend a transportation means when the frequency of touching the map zoom-in icon is high. As another example, the determination unit 140 may determine to recommend a transportation means when the frequency of touching an icon for checking the remaining time to a destination is high. As described above, when a specific area or a specific icon on the display is frequently touched, the determination unit 140 can determine to recommend a transportation means.

The determination unit 140 can determine a discontent index for each of a traffic congestion degree, a passenger discontent degree, and input from a passenger, and can determine whether to recommend a transportation means by generally considering the discontent indexes. The determination unit 140 may determine whether to recommend a transportation means by applying a weight to the discontent indexes and generally considering the discontent indexes.

The calculation unit 150 can update an expected arrival time of the vehicle to a destination on a navigation route of the vehicle based on information about traffic information that the communication unit 100 receives from an external device or other vehicles. The expected arrival time of a vehicle is a time at which a passenger is expected to arrive at a destination using the vehicle. As an example, the interface unit 160 can receive a route re-search request from a passenger and the calculation unit 150 can calculate an expected arrival time at the current point in time in accordance with the route re-search request. As another example, the calculation unit 150 can periodically update the expected arrival time.

As the expected arrival time of the vehicle is updated, the determination unit 140 can determine whether to recommend a transportation means around the vehicle. As an example, the determination unit 140 can determine whether to recommend a transportation means based on the difference between the expected arrival time of the vehicle and the updated expected arrival time of the vehicle. The determination unit 140 can determine to recommend a transportation means when the difference between the expected arrival time of the vehicle and the updated expected arrival time of the vehicle is larger than a preset time. For example, the determination unit 140 can determine to recommend a transportation means when the difference between the expected arrival time of the vehicle and the updated expected arrival time of the vehicle is 15 minutes or more.

As the embodiments described above, the determination unit 140 can determine to recommend another transportation means to a passenger in the vehicle.

The calculation unit 150 calculates at least one of an expected arrival time or an expected fare for a passenger to arrive at a destination on a navigation route using the transportation means. The expected arrival time of a passenger is a time at which a passenger is expected to be able to arrive at a destination using the transportation means. The calculation unit 150 can calculate at least one of an expected arrival time or an expected fare for a passenger based on at least one of traffic information that the communication unit 100 receives from an external device or other vehicles or information about the transportation means around the vehicle.

In detail, the calculation unit 150 can calculate a time that will be taken for a passenger to go a first route between the current location of the vehicle and the location of the transportation means and a time that will be taken for the passenger to go a second route between the transportation means and a destination, and can calculate an expected arrival time to the destination based on the current time and the calculated times. In this case, the first route may include a walking route and the route of the vehicle and the second route may include the route of the transportation means. The first route includes a route between the current location of the vehicle and a stop location of the vehicle and a route between the stop location of the vehicle and the location of the transportation means. Further, the first route or the second route may further include routes of other transportation means. A route may be created by the control unit 130 in this specification.

The calculation unit 150 can calculate an expected fare according to the first route and the second route.

The interface unit 160 provides a passenger with at least one of the expected arrival time or the expected fare of the passenger. The interface unit 160 can receive a response indicating a use of the transportation means from a passenger.

When a passenger selects the transportation means, the control unit 130 can control the vehicle to stop on the route between the current location of the vehicle and the location of the transportation means. The interface unit 160 can provide the passenger with the route from the stop location of the vehicle and the location of the transportation means.

When a passenger does not select the transportation means, the interface unit 160 can keep providing the navigation route of the vehicle. When a passenger does not select the transportation means, the determination unit 140 can determine not to recommend the transportation means for a predetermined time.

When there is a plurality of transportation means around the vehicle, the determination unit 140 can determine whether to recommend the plurality of transportation means around the vehicle based on at least one of a traffic congestion degree in a navigation route of the vehicle, the discontent degree of a passenger, input from the passenger, or an update of an expected arrival time for each of the plurality of transportation means. The calculation unit 150 can calculate at least one of an expected arrival time and an expected fare for each of the plurality of the transportation means. The interface unit 160 can provide a passenger with at least one of the expected arrival time or the expected fare of each of the plurality of the transportation means. A passenger can select one of the plurality of the transportation means using the interface unit 160 or a passenger terminal. The interface unit 160 can provide the passenger with a route to the location of the selected transportation means.

As described above, the HMI device 10 can reduce an arrival time of a passenger, improve travel convenience for the passenger, and provide a smart solution by recommending a transportation means that enables the passenger to arrive at a destination earlier in consideration of a traffic situation, the state of the passenger, input from the passenger, or the like. When the HMI device 10 is a robotaxi, reliability of the robotaxi can be improved.

Figure 2A:
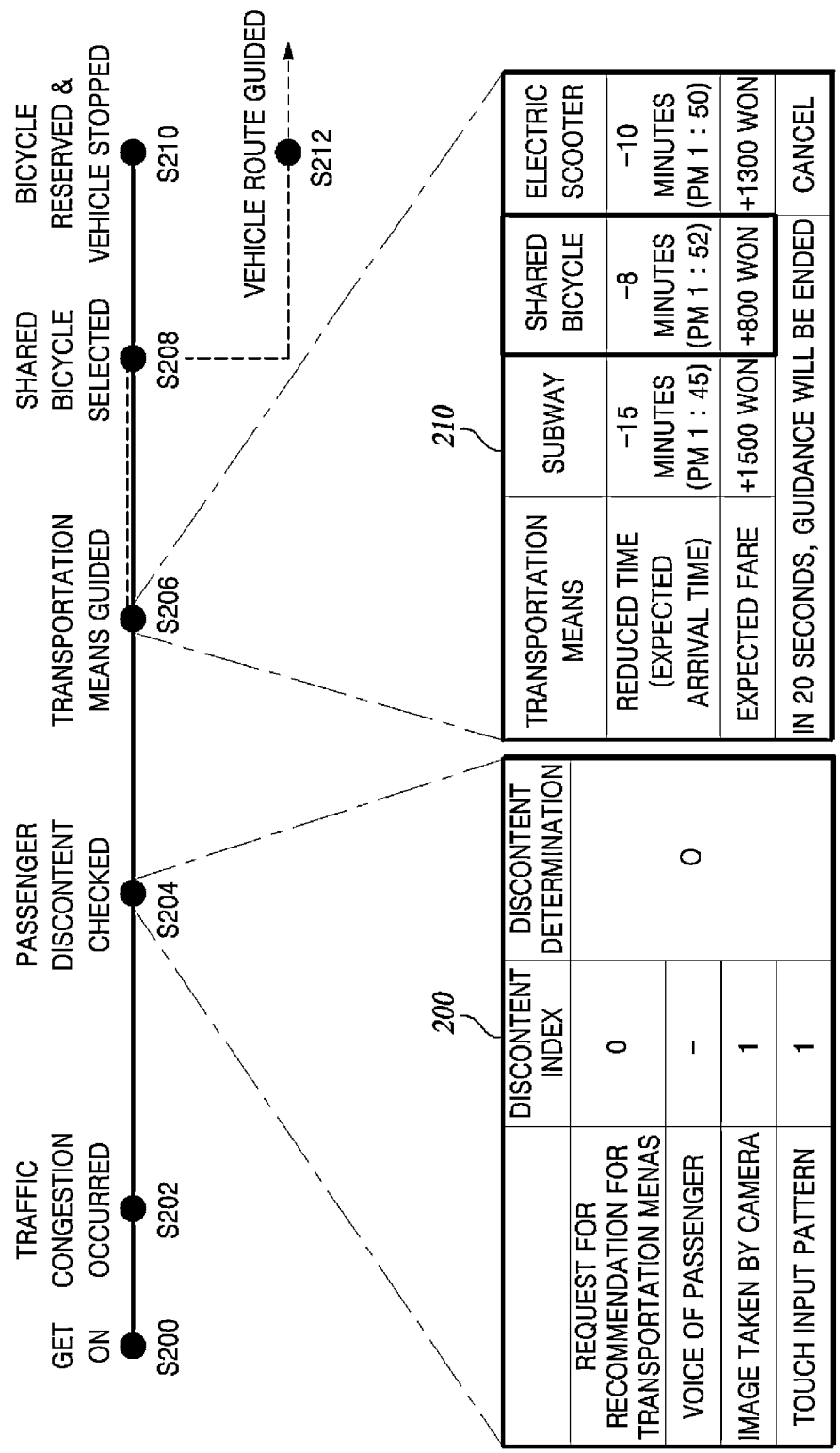
FIGS. 2A, 2B, and 2C are diagrams showing a process of controlling the HMI device according to embodiments of the present disclosure.
Figure 2B:
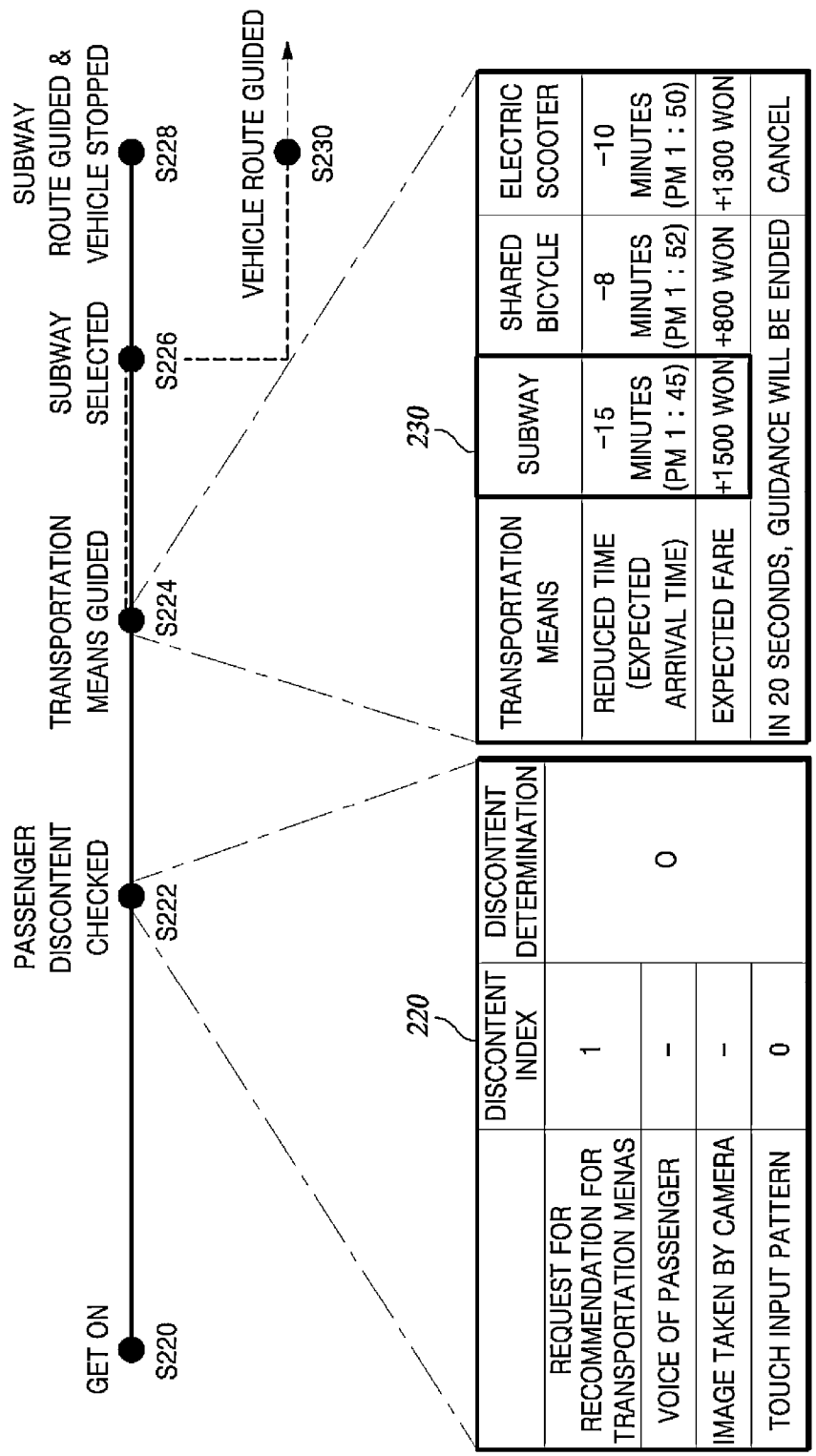
Figure 2C:
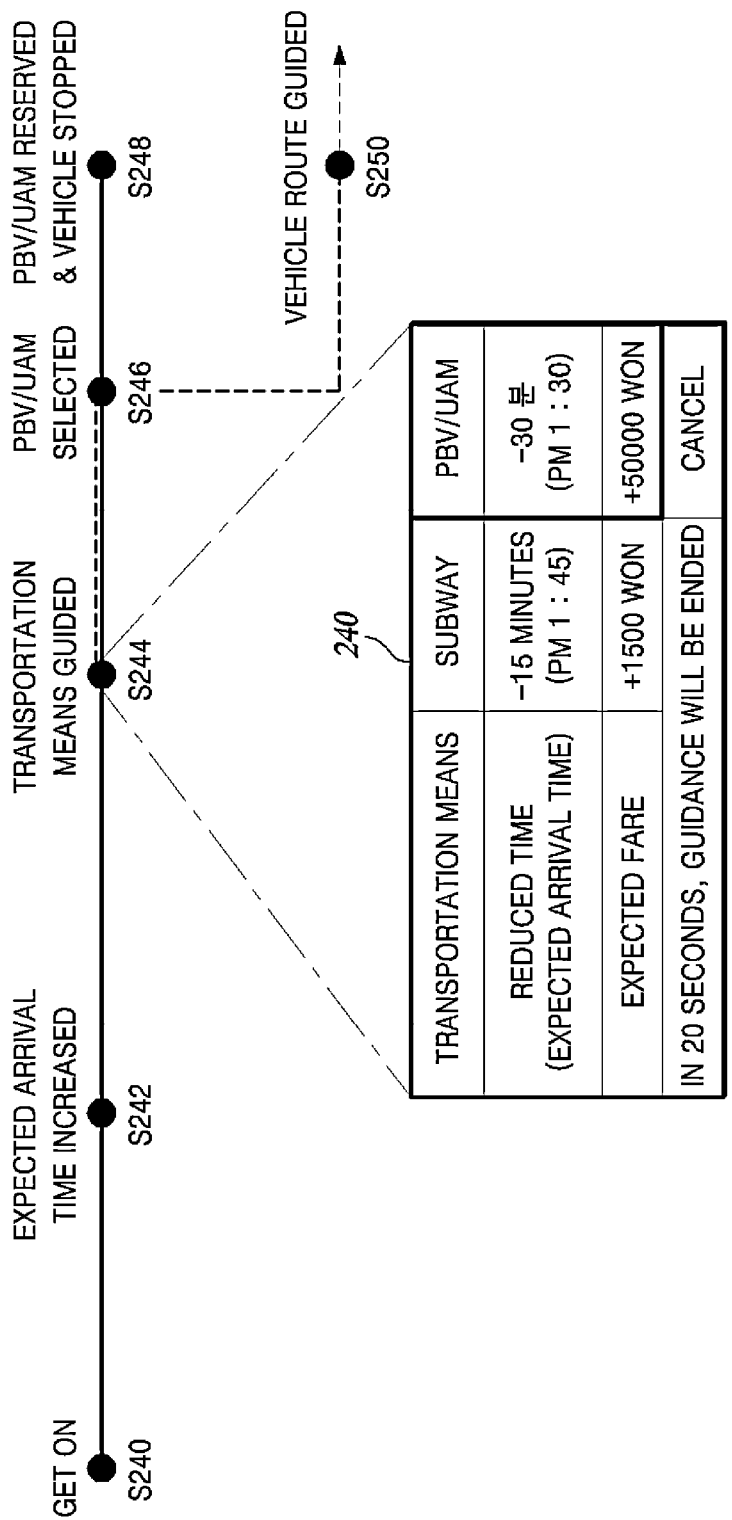

FIGS. 2A, 2B, and 2C are diagrams showing a process of controlling the HMI device according to embodiments of the present disclosure.

Referring to FIG. 2A, the HMI device can recommend a plurality of transportation means to a passenger in accordance with a traffic congestion degree and a passenger discontent degree. The HMI device may be mounted on a vehicle.

In step S200, a passenger gets in a vehicle.

In step S202, a traffic congestion occurs. In detail, the HMI device can determine the degree of the traffic congestion based on traffic information on a navigation route or driving information of other vehicles. The HMI device may determine that traffic congestion has occurred, depending on the degree of the traffic congestion.

In step S204, when the traffic congestion is determined, the HMI device checks passenger discontent. In detail, the passenger may show anxious behavior and may input touch inputs through the interface of the HMI device without inputting a transportation means recommendation request. When there is not a transportation means recommendation request, as in a discontent determination table 200, the HMI device can determine a discontent index for a transportation means recommendation request as 0. When a voice of the passenger is not sensed, the HMI device can determine a discontent index for a voice of the passenger as null. When anxious behavior of the passenger is sensed from an image taken by a camera, the HMI device can determine a discontent index for the image taken by the camera as 1. The HMI device can determine a discontent index for a touch input pattern as 1 based on the touch input pattern through the interface of the HMI device from the passenger. Finally, the HMI device can determine that the passenger is discontent based on a plurality of discontent indexes.

In step S206, the HMI device recommends a plurality of transportation means positioned around the vehicle to the passenger. The HMI device may recommend a plurality of transportation means to the passenger using a GUI. The HMI device can visually provide a plurality of transportation means list 210 to the passenger. In detail, the HMI device may recommend a subway, a shared bicycle, and an electric scooter. In this case, the HMI device can provide the passenger with an expected arrival time and an expected fare of each transportation means. When the passenger uses a subway, a shared bicycle, and an electric scooter, the passenger can arrive at the destination 15 minutes, 8 minutes, and 10 minutes, respectively, earlier than the expected arrival time of the vehicle. However, a fare (e.g., 1500 Won, 800 Won, and 1300 Won) may be charged for the transportation means, respectively.

In step S208, the passenger, for example, selects the shared bicycle and the HMI device can receive the selection from the passenger through the interface.

When the passenger selects the bicycle, in step S210, the HMI device can lease the shared vehicle by communicating with the server that manages the shared bicycle. The HMI device stops the vehicle in an allowable stop area for vehicles. Further, the HMI device can provide a route to the location of a reserved shared bicycle to the passenger.

When the passenger does not select the recommended types of transportation means for a predetermined time, in step S212, the HMI device keeps the existing vehicle route guidance.

Referring to FIG. 2B, the HMI device can recommend a plurality of transportation means to a passenger in accordance with input of a passenger.

In step S220, a passenger gets in a vehicle.

In step S222, the HMI device receives a transportation means recommendation request and may determine that the passenger is discontent, depending on the transportation means recommendation request. As in the discontent determination table 220, the HMI device can handle the transportation means recommendation request over a voice of the passenger, an image taken by a camera, and a touch input pattern. In other words, even if the discontent indexes for a voice of the passenger, an image taken by a camera, and a touch input pattern do not indicate that a passenger is discontent, the HMI device can determine that the passenger is discontent.

In step S224, the HMI device recommends a plurality of transportation means positioned around the vehicle to the passenger. The HMI device may recommend a plurality of transportation means to a passenger using a GUI. The HMI device can visually provide a transportation means list 230 to the passenger.

In step S226, the passenger selects, for example, the subway and the HMI device can receive the selection from the passenger through the interface.

When the passenger selects a subway, in step S228, the HMI device can provide the passenger with a route to the location of the subway. The HMI device stops the vehicle in an allowable stop area for vehicles.

When the passenger does not select the recommended types of transportation means for a predetermined time, in step S230, the HMI device keeps the existing vehicle route guidance.

Referring to FIG. 2C, the HMI device can recommend a plurality of transportation means to a passenger in accordance with input of the passenger.

In step S240, a passenger gets in a vehicle.

In step S242, an expected arrival time of the vehicle increases. The HMI device updates the expected arrival time of the vehicle. In detail, the HMI device updates the time at which the passenger is expected to arrive at a destination using the vehicle. The HMI device can update the expected arrival time of the vehicle in accordance with an update request or a route re-search request from the passenger. The HMI device may periodically update the expected arrival time of the vehicle without a request from the passenger. When the expected arrival time of the vehicle increases over 15 minutes, the HMI device can determine that it is required to recommend a transportation means.

In step S224, the HMI device recommends a plurality of transportation means positioned around the vehicle to the passenger. The HMI device may recommend a plurality of transportation means to a passenger using a GUI. The HMI device can visually provide a plurality of transportation means list 240 to the passenger. In detail, the HMI device may recommend a subway and a PBV/UAM.

In step S246, the passenger selects the PBV/UAM and the HMI device can receive the selection of the passenger through the interface.

When the passenger selects the PBV/UAM, in step S248, the HMI device can provide the passenger with a route to the location of the PBV/UAM. The HMI device stops the vehicle in an allowable stop area for vehicles.

When the passenger does not select the recommended types of transportation means for a predetermined time, in step S530, the HMI device keeps the existing vehicle route guidance.

FIGS. 3A, 3B, 3C, and 3D are diagrams showing a GUI according to an embodiment of the present disclosure.

In FIGS. 3A, 3B, 3C, and 3D, a GUI 30 may be a graphic interface that is displayed on a passenger terminal. As another example, the GUI 30 may be a graphic interface that is displayed on a display in a vehicle.

Figure 3A:
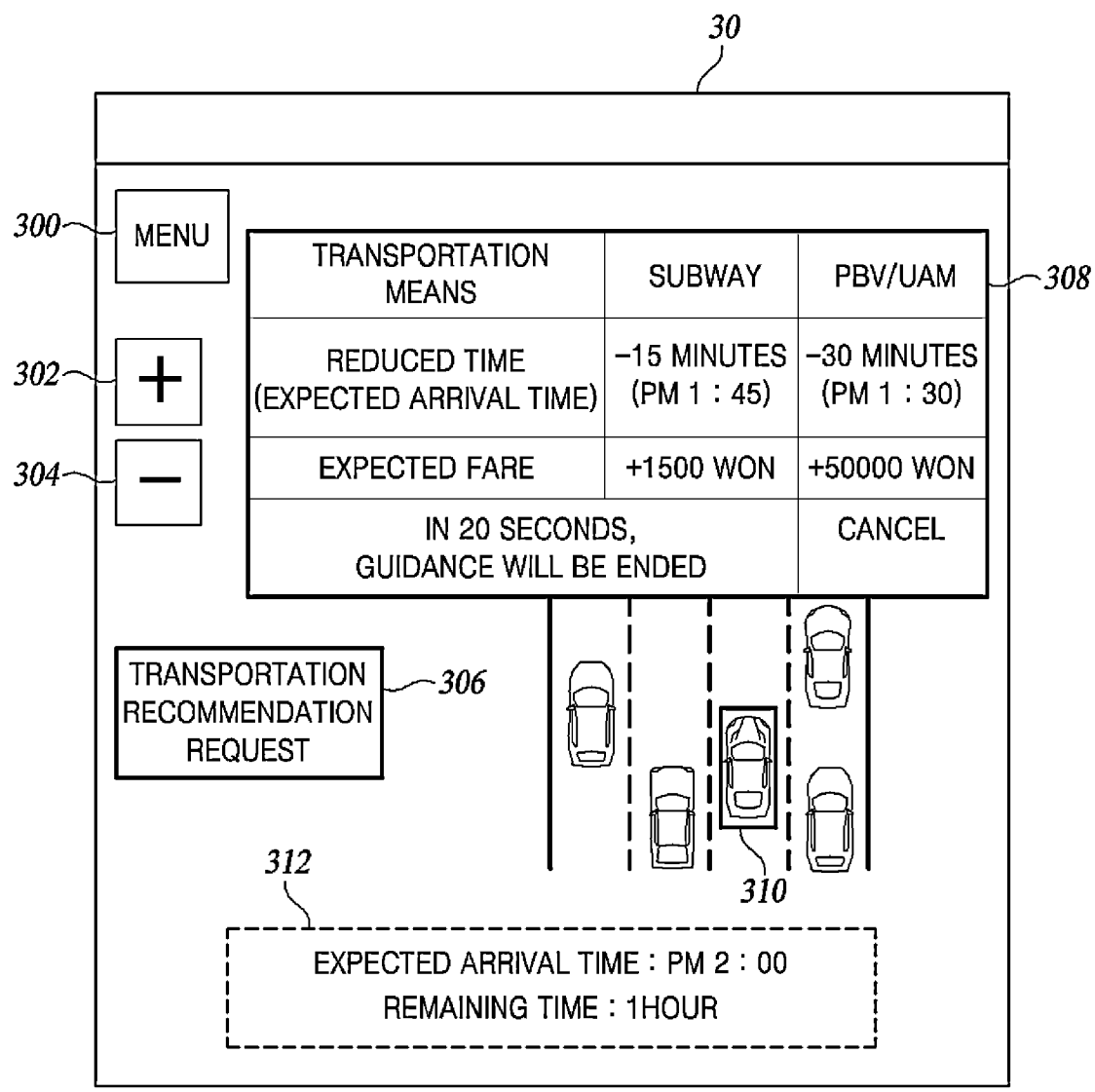
FIGS. 3A, 3B, 3C, and 3D are diagrams showing a Graphical User Interface (GUI) according to an embodiment of the present disclosure.

Referring to FIG. 3A, the GUI 30 includes a menu object 300, a map zoom-in object 302, a map zoom-out object 304, a transportation means recommendation request object 306, a transportation means list object 308, a vehicle display object 310, and time display object 312.

A passenger may frequently press the map zoom-in object 302 or the map zoom-out object 304 when the passenger is discontent with the current driving situation of the vehicle. The HMI device may determine that a passenger is discontent, depending on the touch input pattern of the passenger on the map zoom-in object 302 or the map zoom-out object 304.

When a passenger is discontent with the current driving situation of the vehicle, the passenger can be recommended a plurality of transportation means that can arrive at a destination earlier than the vehicle by pressing the transportation means recommendation request object 306.

The transportation means list object 308 includes information about the kinds, expected arrival times, and fares of a plurality of transportation means. A passenger can press one transportation means object or a cancel object in the transportation means list object 308.

The time display object 312 provides information about the time at which the vehicle is expected to arrive at a destination, and a remaining time.

Figure 3B:
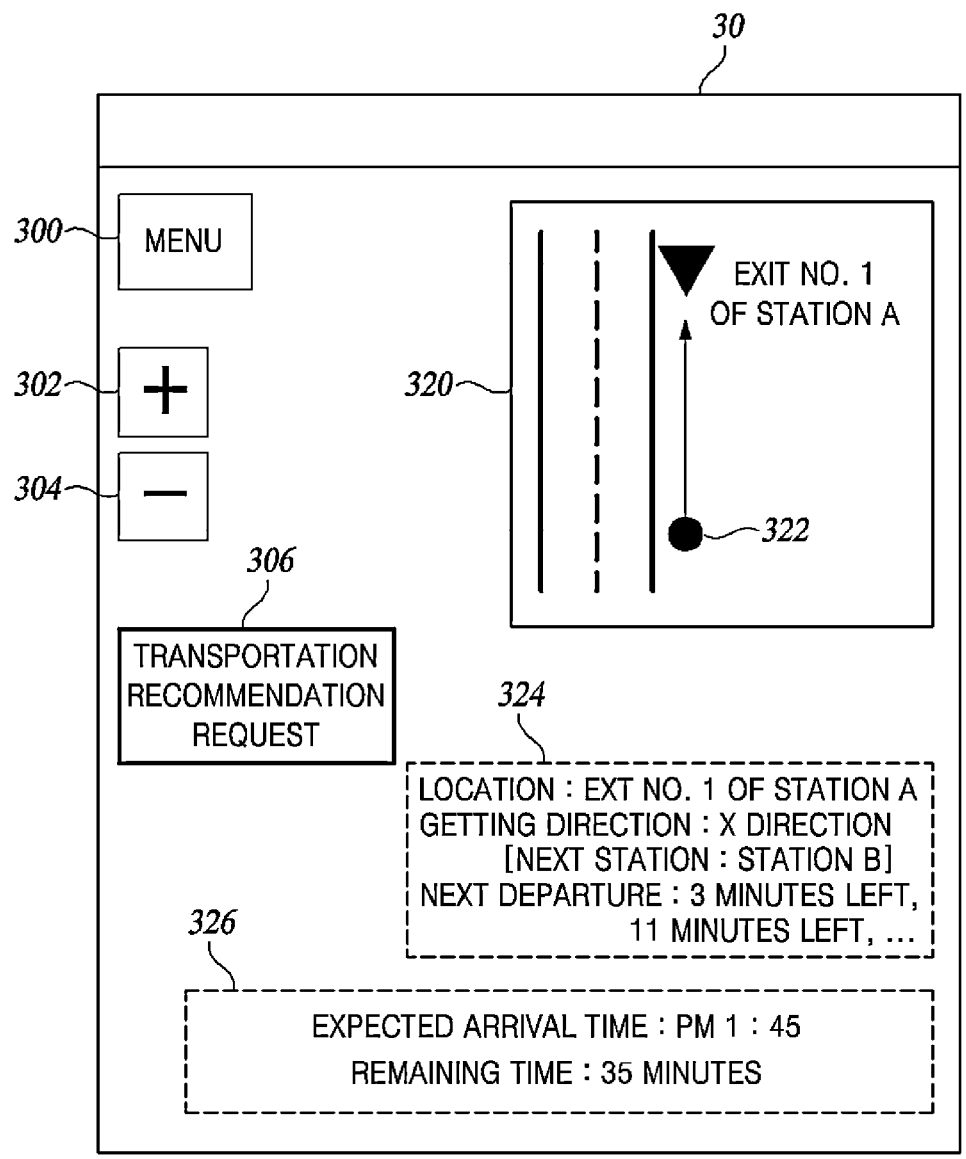

Referring to FIG. 3B, a passenger can select a subway from the plurality of transportation means recommended by the HMI device. In this case, the GUI 30 includes a menu object 300, a map zoom-in object 302, a map zoom-out object 304, a transportation means recommendation request object 306, a map object 320, a getting-off location object 322, a transportation means information display object 324, and a time display object 326.

The map object 320 provides the getting-off location object 322, the locations of subway entrances, and routes to the locations of the subway entrances in a geographic type.

The transportation means information display object 324 provides the locations of entrances of a subway that a passenger wants to get on, a direction of the desired subway, and schedule information.

The time display object 326 provides information about the time at which the passenger is expected to arrive at a destination using a subway, and a remaining time.

Figure 3C:
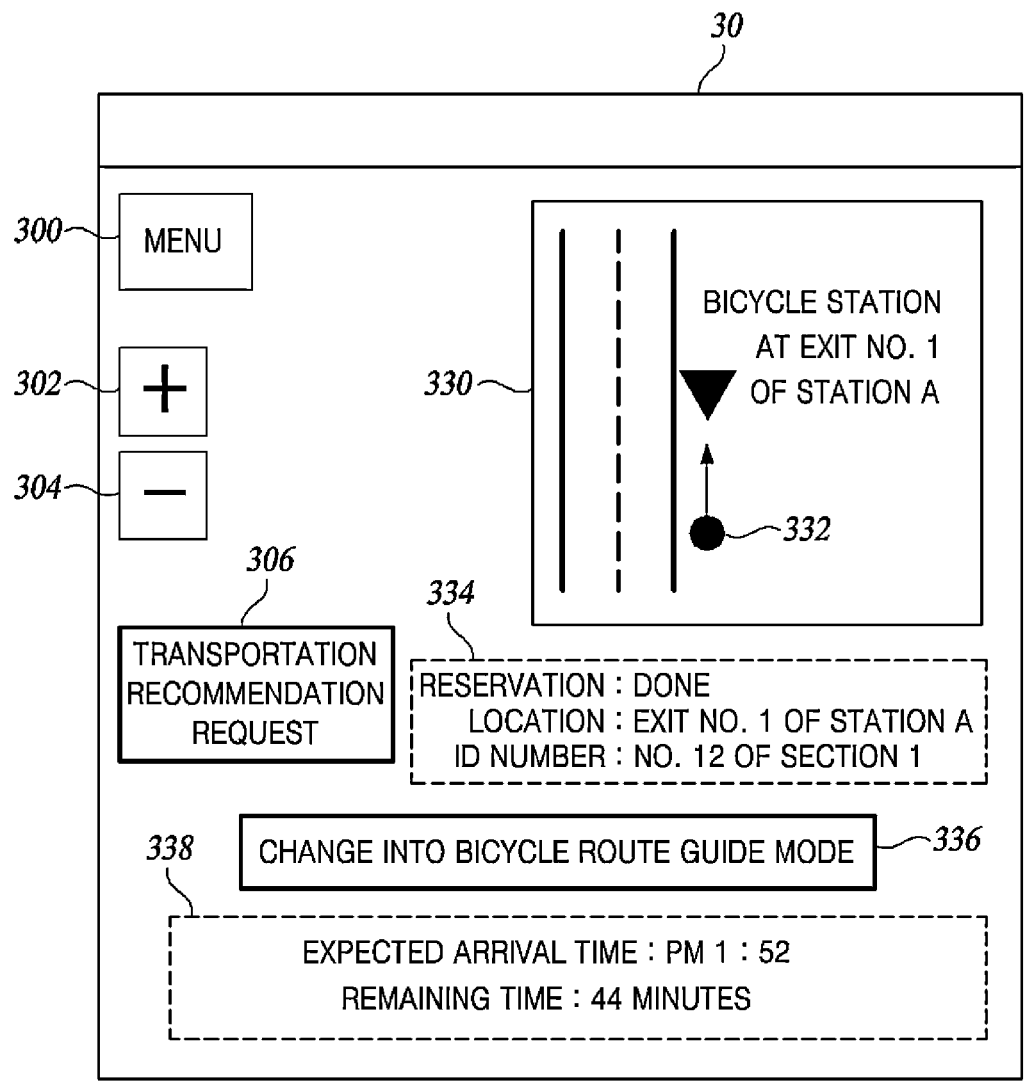

Referring to FIG. 3C, a passenger can select a shared bicycle from the plurality of transportation means recommended by the HMI device. In this case, the GUI 30 includes a menu object 300, a map zoom-in object 302, a map zoom-out object 304, a transportation means recommendation request object 306, a map object 330, a getting-off location object 332, a transportation means information display object 334, a guide mode change object 336, and a time display object 338.

The map object 330 provides the getting-off location object 332, the location of the reserved bicycle, and a route to the location of the reserved bicycle in a geographic type.

The transportation means information display object 334 provides whether the bicycle has been reserved, the location of the reserved bicycle, and the ID number of the reserved bicycle.

When the guide mode change object 336 is selected by the passenger, the GUI 30 provides a route between the location of the reserved bicycle and a destination. The GUI 30 can highlight the route of the bicycle.

The time display object 338 provides information about the time at which the passenger is expected to arrive at the destination using the reserved bicycle, and a remaining time.

Figure 3D:
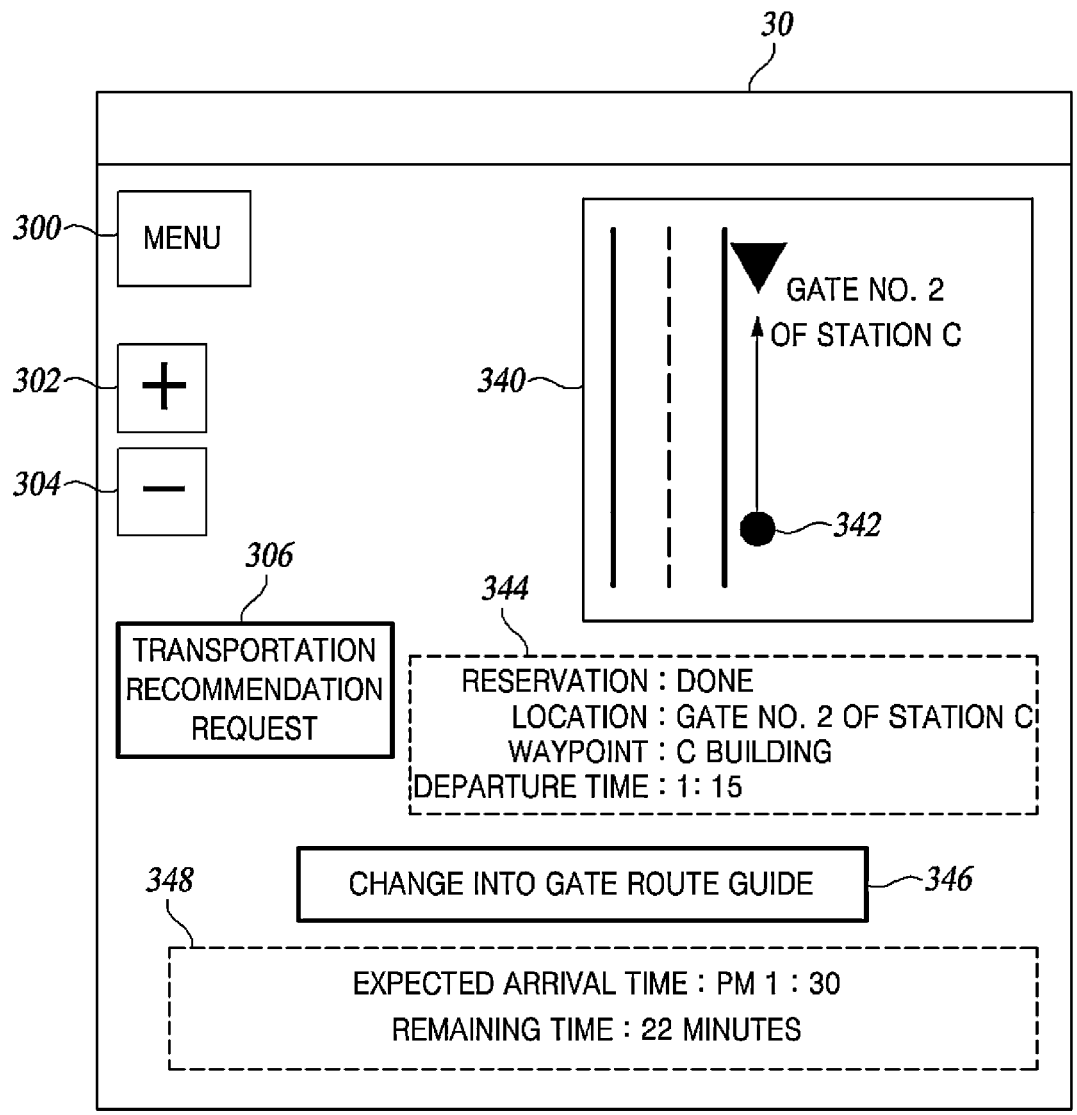

Referring to FIG. 3D, a passenger can select a PBV from the plurality of transportation means recommended by the HMI device. In this case, the GUI 30 includes a menu object 300, a map zoom-in object 302, a map zoom-out object 304, a transportation means recommendation request object 306, a map object 340, a getting-off location object 342, a transportation means information display object 344, a guide mode change object 346, and a time display object 348.

The map object 340 provides the getting-off location object 342, the locations of the gates of the reserved PBV, and routes to the location of the gates of the reserved PBV in a geographic type.

The transportation means information display object 344 provides whether a PBV has been reserved, the locations of the gates of the reserved PBV, waypoints of the reserved PBV, and the departure times of the PBV at the gates.

When the guide mode change object 346 is selected by the passenger, the GUI 30 provides the getting-off location object 342, routes between the locations of the gates of the reserved PBV, and routes between a destination and the locations of the gates of the reserved PBV. The GUI 30 can highlight the route of the PBV.

The time display object 348 provides information about the time at which a passenger is expected to arrive at a destination using the reserved PBV, and a remaining time.

Figure 4:
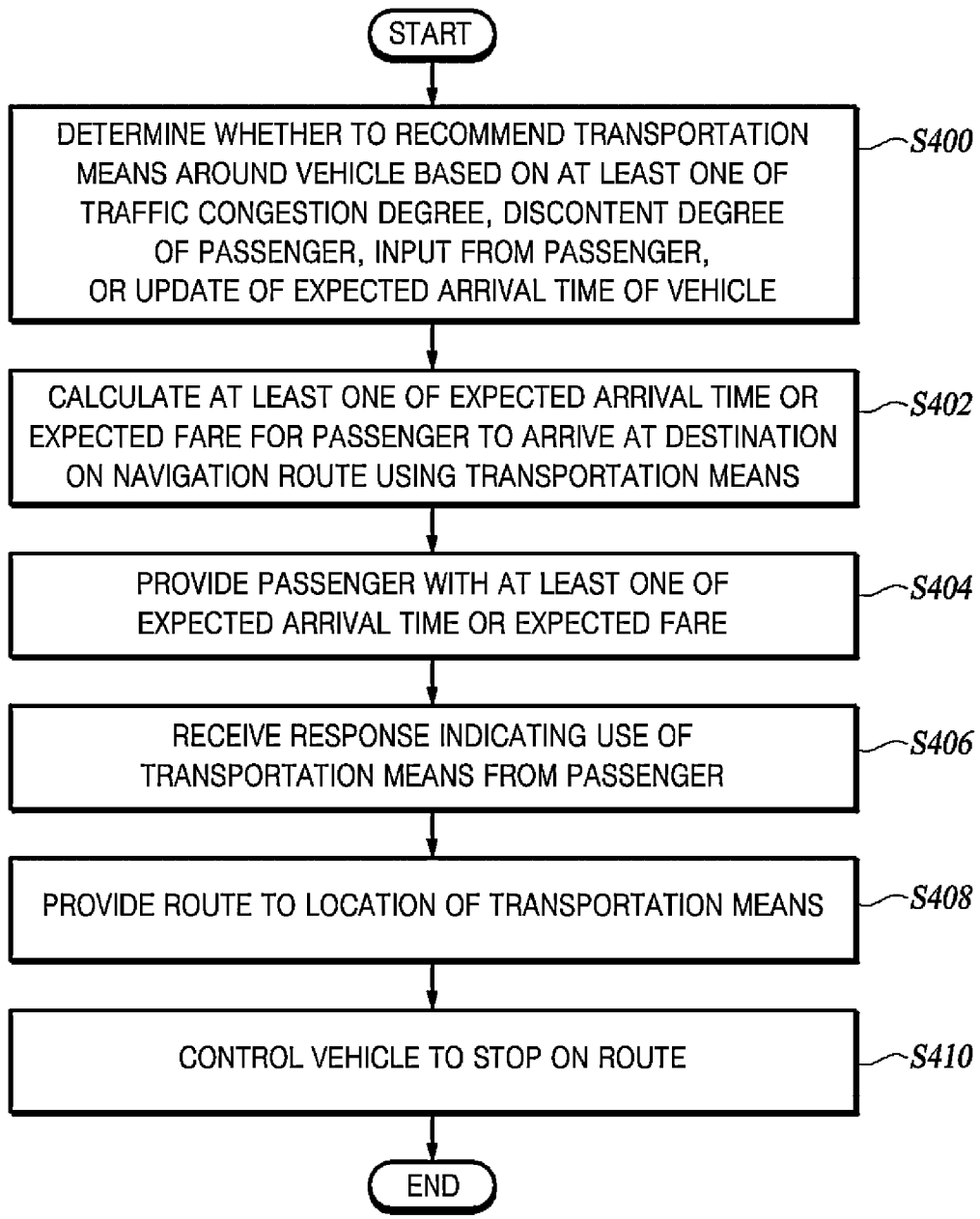
FIG. 4 is a flowchart showing a method of controlling the HMI according to an embodiment of the present disclosure.

FIG. 4 is a flowchart showing a method of controlling the HMI according to an embodiment of the present disclosure.

Referring to FIG. 4, an HMI device determines whether to recommend a transportation means around a vehicle based on at least one of a traffic congestion degree in a navigation route of the vehicle, the discontent degree of a passenger, input from the passenger, or an update of an expected arrival time of the vehicle (S400).

As an example, the HMI device may determine a traffic congestion degree based on traffic information on a navigation route of the vehicle or may determine a traffic congestion degree by comparing the speed limit of a navigation route with the average speed of other vehicles on the navigation route. The HMI device determines a passenger discontent degree based on at least one of a voice of the passenger or an image taken by a camera when the traffic congestion degree is high. The HMI device can determine a first discontent index based on the frequency of specific words included in the voice of the passenger, can determine a second discontent index based on at least one of the facial expression, the gaze, or the behavior of the passenger in an image taken by a camera, and can determine the discontent degree of the passenger based on at least one of the first discontent index or the second discontent index. The HMI device may determine the discontent degree of the passenger by applying a weight to each of the first discontent index and the second discontent index.

The HMI device determines to recommend transportation means around the vehicle when the discontent degree of the passenger is high.

As another example, the HMI device receives a request for recommendation for transportation means from the passenger. When receiving a transportation means recommendation request, the HMI device determines to recommend a transportation means around the vehicle.

As another example, the HMI device receives touch inputs from a passenger as input of a passenger. The HMI device determines whether to recommend a transportation means around the vehicle based on the pattern of the touch inputs.

As another example, the HMI device updates an expected arrival time of the vehicle to arrive at a destination on a navigation route in accordance with a request from the passenger or a periodic update setting. When the difference between the expected arrival time of the vehicle and the updated expected arrival time is 15 minutes or more, the HMI device determines to recommend a transportation means around the vehicle.

The HMI device calculates at least one of an expected arrival time or an expected fare for the passenger to arrive at a destination on a navigation route using the transportation means (S402).

The HMI device provides the passenger with at least one of the expected arrival time or the expected fare of the passenger (S404).

When there is a plurality of transportation means around the vehicle, the HMI device can determine whether to recommend a plurality of transportation means and the HMI device can provide the passenger with at least one of the expected arrival time or the expected fare of each of the plurality of the transportation means.

The HMI device receives a response indicating use of transportation means from the passanger (S406).

The HMI device provides a route to the location of the transportation means (S408).

When the transportation means is a shared transportation means, the HMI device can reserve transportation means through a server that manages the shared transportation means.

The HMI device controls the vehicle to stop on the route (S410).

As described above, an embodiment of the present disclosure can reduce a travel time for a passenger by recommending other transportation means that can arrive at a destination earlier than a vehicle during autonomous driving of the vehicle, and a method of controlling the HMI device.

Another embodiment of the present disclosure can provide a passenger with an improved convenience service by considering a traffic congestion degree, the discontent degree of a passenger, input from the passenger, or an update of an expected arrival time to recommend other transportation means.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include an implementation using one or more computer programs executable on a programmable system. The programmable system includes at least one programmable processor (which may be a special purpose processor or a general-purpose processor) coupled to receive and transmit data and instructions from and to a storage system, at least one input device, and at least one output device. Computer programs (also known as programs, software, software applications or codes) contain instructions for a programmable processor and are stored in a "computer-readable recording medium".

The computer-readable recording medium includes all types of recording devices in which data readable by a computer system are stored. The computer-readable recording medium may include non-volatile or non-transitory, such as ROM, CD-ROM, magnetic tape, floppy disk, memory card, hard disk, magneto-optical disk, and storage device, and may further include a transitory medium such as a data transmission medium. In addition, the computer-readable recording medium may be distributed in a network-connected computer system, and the computer-readable codes may be stored and executed in a distributed manner.

Although the present disclosure is described such that each process is sequentially executed in the flowchart/timing diagram of the present specification, this is merely illustrative of the technical idea of one embodiment of the present disclosure. In other words, since a person of ordinary skill in the art to which the embodiments of the present disclosure pertain may make various modifications and changes by changing the order described in the flowchart/timing diagram or performing in parallel one or more of the steps, without departing from the essential characteristics of the present disclosure the flowchart/timing diagram is not limited to a time-series order.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present disclosure is not limited by the illustrations. Accordingly, those having ordinary skill in the art should understand the scope of the present disclosure should not be limited by the above explicitly described embodiments but by the claims and equivalents thereof.

What is claimed is:

1. A Human Machine Interface (HMI) device for a vehicle, the HMI device comprising:
   an interface unit;
   at least one memory storing computer-executable instructions; and
   at least one processor,
   wherein the at least one processor is configured to execute the computer-executable instructions to:
   a determine whether to recommend a transportation means around a vehicle based on at least one of a traffic congestion degree in a navigation route of the vehicle, a discontent degree of a passenger, input from the passenger, or an update of an expected arrival time of the vehicle;
   provide the passenger with at least one of an expected arrival time or an expected fare for the passenger to arrive at a destination on the navigation route using the transportation means through the interface unit;
   receive a response indicating a use of the transportation means from the passenger through the interface unit;
   provide, in response to receiving the response indicating the use of the transportation means from the passenger, a route to a location of the transportation means through the interface unit; and
   control the vehicle to stop on the route.

2. The HMI device of claim 1, wherein the at least one processor is configured to determine the traffic congestion degree based on traffic information of the navigation route of the vehicle.

3. The HMI device of claim 1, wherein the at least one processor is configured to determine the traffic congestion degree by comparing a speed limit of the navigation route with an average speed of other vehicles on the navigation route.

4. The HMI device of claim 1, wherein the at least one processor is configured to determine the discontent degree of the passenger based on at least one of a voice of the passenger or an image taken by a camera.

5. The HMI device of claim 4, wherein the at least one processor is configured to:
   determine a first discontent index based on frequency of specific words included in the voice of the passenger;
   determine a second discontent index based on at least one of a facial expression, a gaze, or behavior of the passenger included in the image taken by the camera; and
   determine the discontent degree of the passenger based on at least one of the first discontent index or the second discontent index.

6. The HMI device of claim 5, wherein the at least one processor is configured to determine the discontent degree of the passenger by applying a weight to each of the first discontent index and the second discontent index.

7. The HMI device of claim 1, wherein the at least one processor is configured to:
   update the expected arrival time of the vehicle to arrive at a destination on the navigation route, and
   determine whether to recommend the transportation means based on a difference between the expected arrival time and the updated expected arrival time of the vehicle.

8. The HMI device of claim 1, wherein the interface unit is configured to receive a request for recommendation for a transportation means from the passenger as input from the passenger.

9. The HMI device of claim 1, wherein the interface unit is configured to receive touch inputs from the passenger as input from the passenger, and
   wherein the at least one processor is configured to determine whether to recommend a transportation means of the vehicle based on a pattern of the touch inputs.

10. The HMI device of claim 1, wherein the at least one processor is configured to reserve the transportation means through a server that manages a shared transportation means when the transportation means is the shared transportation means.

11. The HMI device of claim 1, wherein the interface unit is configured to include at least one of a communication interface or a Graphic User Interface (GUI).

12. The HMI device of claim 1, wherein when the at least one processor is configured to determine whether to recommend a plurality of transportation means, the interface unit is configured to provide the passenger with at least one of an expected arrival time or an expected fare for each of the plurality of transportation means.

13. A method of controlling a Human Machine Interface (HMI) device for a vehicle, the method comprising:
   determining whether to recommend a transportation means around a vehicle based on at least one of a traffic congestion degree in a navigation route of the vehicle, a discontent degree of the passenger, input from the passenger, or an update of an expected arrival time of the vehicle;
   providing at least one of an expected arrival time or an expected fare of the passenger to arrive at a destination on the navigation route using the transportation means through an interface unit;
   providing, in response to receiving a response indicating a use of the transportation means from the passenger, a route to a location of the transportation means through the interface unit; and
   controlling the vehicle to stop on the route.

* * * * *